United States Patent [19]

Stavropoulos

[11] Patent Number: 4,486,208
[45] Date of Patent: * Dec. 4, 1984

[54] CONDENSATE REMOVAL DEVICE FOR STEAM LINES AND THE LIKE

[75] Inventor: Constantine N. Stavropoulos, Addison, Ill.

[73] Assignee: Engineering Resources, Inc., Chicago, Ill.

[*] Notice: The portion of the term of this patent subsequent to Jan. 17, 2001 has been disclaimed.

[21] Appl. No.: 529,111

[22] Filed: Oct. 11, 1983

Related U.S. Application Data

[63] Continuation of Ser. No. 366,787, Apr. 9, 1982, Pat. No. 4,426,213, which is a continuation of Ser. No. 207,802, Nov. 17, 1980, abandoned.

[51] Int. Cl.³ .......................... B01D 46/10; F15D 1/02
[52] U.S. Cl. .................................................... 55/466
[58] Field of Search ................. 55/185, 190, 199, 277, 55/466, 502; 138/41, 44; 210/451, 459; 239/390, 391, 396, 590.5, 591

[56] References Cited

U.S. PATENT DOCUMENTS 2,790,463  4/1957  Delano et al. .................. 138/44
4,235,379  11/1980  Beamer ........................... 239/390

FOREIGN PATENT DOCUMENTS 669525  11/1929  France ............................. 239/591
432033  7/1935  United Kingdom .

Primary Examiner—David L. Lacey
Attorney, Agent, or Firm—Silverman, Cass & Singer, Ltd.

[57] ABSTRACT

A flow constriction device, typically for drainage of steam condensate, is provided with a tubular nozzle structure inserted within a bore formed in the body of the device. The insertable tubular nozzle structure provides convenient variation in flow constriction dimensions which can be employed with a generally standardized bore dimension.

2 Claims, 14 Drawing Figures

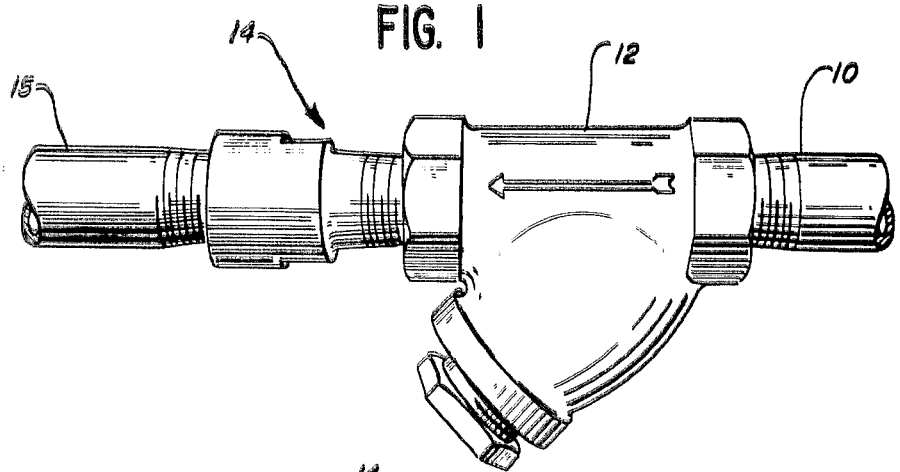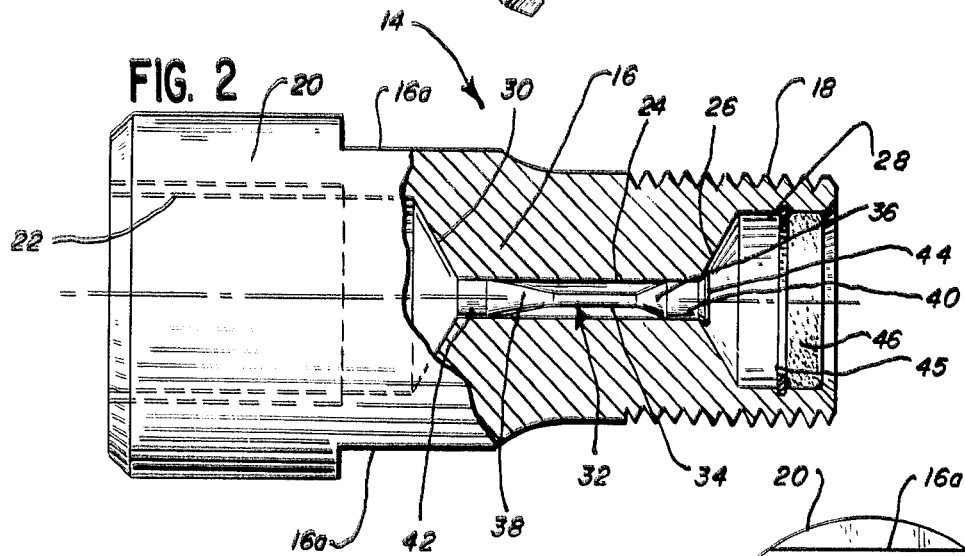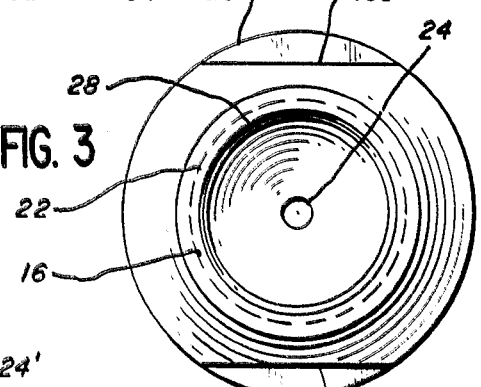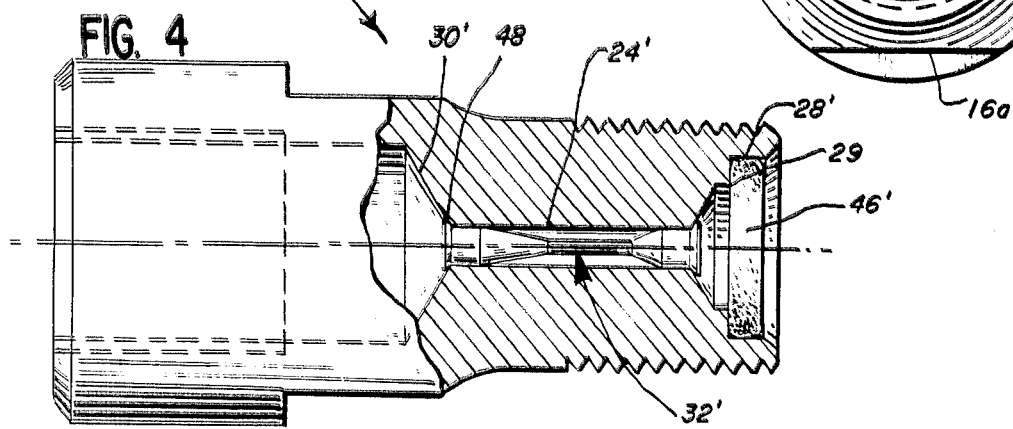

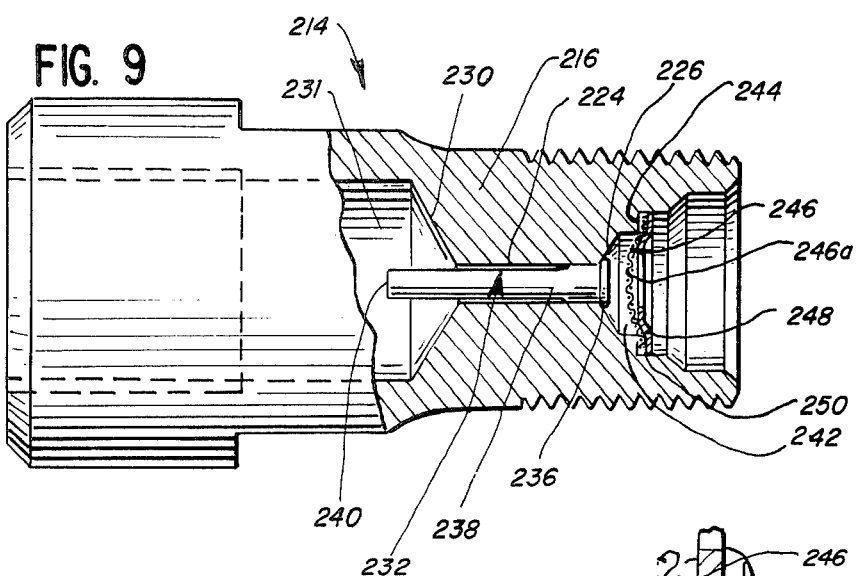
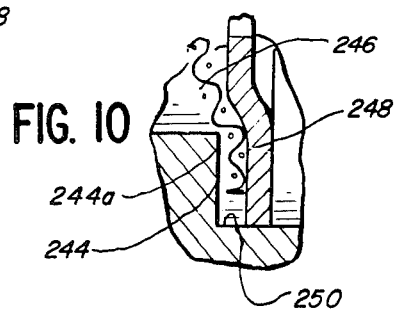
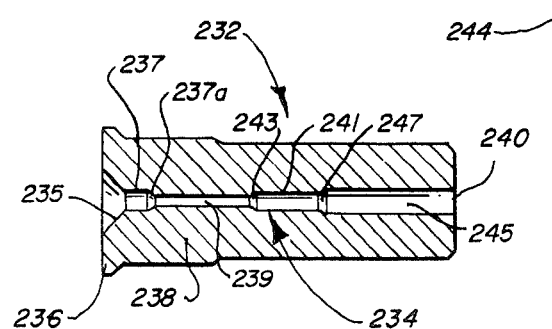

CONDENSATE REMOVAL DEVICE FOR STEAM LINES AND THE LIKE

This is a continuation of application Ser. No. 366,787 filed Apr. 9, 1982, now U.S. Pat. No. 4,426,213, which is a continuation of application Ser. No. 207,802 filed Nov. 17, 1980, now abandoned.

BACKGROUND OF THE INVENTION

This invention relates to liquid drainage devices for fluid conduit systems. More particularly, this invention relates to devices for removing condensate from steam lines.

Steam piping systems must be provided with equipment to remove the condensate which accumulates as heat is lost from the steam. Generally, condensate removal equipment is located at low points or pockets in the steam piping and at regular intervals in the extended runs of the steam piping, as well as at steam-driven equipment which could be damaged by condensate. Older equipment, such as the widely employed inverted bucket condensate trap, has increasingly been replaced with more simplified orifice devices, for example, those devices described in U.S. Pat. Nos. 3,715,870 and 3,877,895, in which a plate having an orifice is positioned in steam lines enabling condensate to be forced through the small diameter orifice by the high pressure steam; when the orifice is properly sized, condensate obstructs passage of steam through the orifice in order to minimize steam loss while permitting drainage of the condensate.

U.S. Pat. No. 4,171,209 describes a device in which an orifice plate is unitarily formed in the body of a fitting which can be conveniently connected directly into the steam line, preferably downstream from a conventional Y-strainer which removes particulate debris from the accumulated condensate. While such unitarily formed orifice plate devices have been effective and proven to be commercially successful, the drilling of the small orifice required is a difficult process, and because the resulting fitting has an orifice of fixed length and diameter, a multiplicity of variously drilled bodies of fittings are employed to accommodate variation in steam pressures in order to minimize steam loss through the orifice.

SUMMARY OF THE INVENTION

According to this invention, the body of a device for liquid drainage is provided with a bore into which a tubular nozzle structure is inserted for constriction of fluid flow through the device. The body of the device can also be provided with an entrance formation for the bore which provides a seat for a terminal flange formation on the tubular nozzle structure to correctly position it within the bore.

Tapering in the flow constriction of the tubular nozzle structure can be provided in a configuration approximating the configuration of a venturi tube.

Interchangeable tubular nozzle structures provide variation in diameter and length of the constriction which can be employed with a given size bore for service in a range of steam pressures.

The invention enables provision of a standardized body for a constriction device having a standardized bore configuration so that the nozzle structure can be made available as separate items for convenient installation within the standardized bore in accordance with nozzle dimension requirements for proper drainage.

BRIEF DESCRIPTION OF THE DRAWINGS

FIG. 1 illustrates a steam condensate removal line including an embodiment of the flow constriction device according to this invention;

FIG. 2 is a side elevation view of the constriction device shown in FIG. 1, with partial cross-section showing an inserted tubular nozzle structure;

FIG. 3 is an end view of the device shown in FIG. 2 having the tubular nozzle structure removed;

FIG. 4 is a side elevation view of a modified embodiment of a constriction device according to this invention with partial cross-section showing modifications in the flow conduit;

FIG. 9 is a side elevation view of a modified embodiment of the constriction device according to this invention with partial cross-section showing a modified tubular nozzle structure and a filter element arrangement;

FIG. 10 is an enlarged cross-sectional view of the filter element arrangement shown in FIG. 9;

FIG. 11 is an enlarged, cross-sectional side view of the tubular nozzle structure shown in FIG. 9.

DESCRIPTION OF THE PREFERRED EMBODIMENTS

Figure 5:
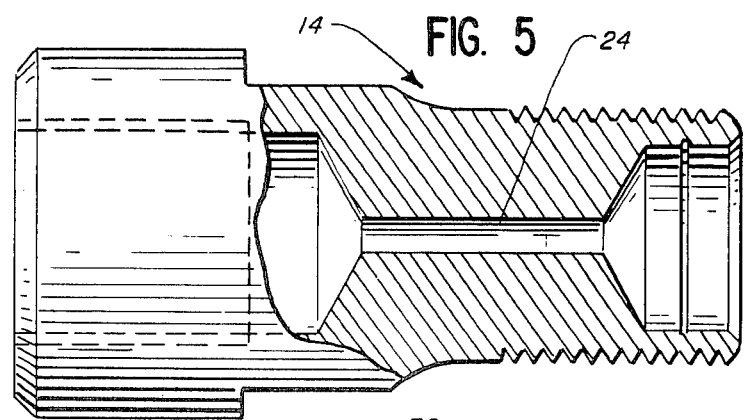
FIG. 5 is a side elevation of the constriction device shown in FIG. 2, with partial cross-section showing the tubular nozzle structure removed.

Referring to the condensate removal line as shown in FIG. 1, a mixture of condensate liquid and some steam is directed under generally high pressure from pipe 10 into a conventional Y-strainer device 12 from right to left as indicated by the direction of the arrow. The strainer unit within Y-strainer 12 filters the condensed liquid to remove debris particles entrained in the mixture, prior to flow of the mixture into an embodiment of the constriction device of this invention, generally designated by reference character 14, which is threaded into the left-hand outlet of Y-strainer 12. Condensate is forced through constriction device 14, as described hereinafter, and drained through condensate return line 15 typically for delivery to a steam boiler (not shown).

Referring to FIG. 2, constriction device 14 includes a generally cylindrical body 16 having an externally threaded male end 18, and having a preferably integrally formed female end 20 housing a threaded socket 22. Male end 18 is designed for preferably threading directly into Y-strainer 12, and female end 20 is designed to receive condensate return line 15, as shown in FIG. 1.

The body 16 houses a preferably coaxially aligned and generally cylindrical bore 24. Bore 24 preferably has a conically formed entrance 26 leading to a generally cylindrical passage 28 forming a somewhat recessed opening in male end 18 of the embodiment shown in FIG. 2. A preferably conically formed exit formation 30 from bore 24 leads to socket 22. Removably inserted within bore 24 is a generally elongate tubular nozzle structure, designated by general reference character 32 in FIG. 2.

As shown in FIG. 2, nozzle structure 32 has the general configuration of a venturi tube with a substantially cylindrical vena contracta 34 joined between converging entrance formation 36 and diverging exit formation 38. Cylindrical inlet 40 and outlet 42 joining entrance 36 and exit 38, respectively, are substantially equal in outer diameter to the diameter of cylindrical bore 24 and can allow frictional press fit of nozzle structure 32 within bore 24. Preferably, inlet formation 40 is provided with an outward flange 44 which engages conical entrance 26 to properly position the insertion of nozzle structure 32 within bore 24. Riveting of flange 44 against conical entrance 26 can be employed to further secure such insertion.

The insertion of nozzle structure 32 into bore 24 allows the drilling of bore 24 to a conveniently large diameter without the difficulty of sizing the bore diameter to the required dimension of the condensate constriction; thus, the nozzle structure 32 can be separately fabricated and then inserted to provide a vena contracta of desired diameter and length to serve as the condensate constriction in a variety of sizes suitable for service under a range of steam pressures with a single bore diameter. Suitably, vena contracta 34 can be fabricated with inner diameter in the range of approximately 0.2–0.9 of the diameter of bore 24, so that substitution of various nozzle structures can allow convenient reduction in the diameter of vena contracta 34 for service under increasing steam pressure. In addition the vena contracta can be conveniently fabricated in a range of lengths as shown in the nozzle structures 32 and 32$a$–32$d$ drawn enlarged in FIGS. 6 and 8$a$–8$d$.

Again referring to FIG. 2, cylindrical passage 28 can be circumferentially grooved to receive a retaining ring 45 for a filter element 46 to remove any debris particles which have passed through Y-strainer 12 and prevent plugging of nozzle device 32. Alternatively, as shown in FIG. 4, cylindrical passage 28' can be provided with a shoulder 29 providing a seat for filter element 46'. Additionally, as shown in FIG. 4, nozzle structure 32' can be provided with a flange 48 which engages conical exit formation 30'.

FIGS. 3 and 5 show end and side views, respectively, of nozzle device 14 shown in FIG. 2 with tubular nozzle structure 32 removed from bore 24. FIG. 3 also shows the opposing flat seats 16$a$ formed in the surface of body 16 for engagement by a wrench.

Figure 6:
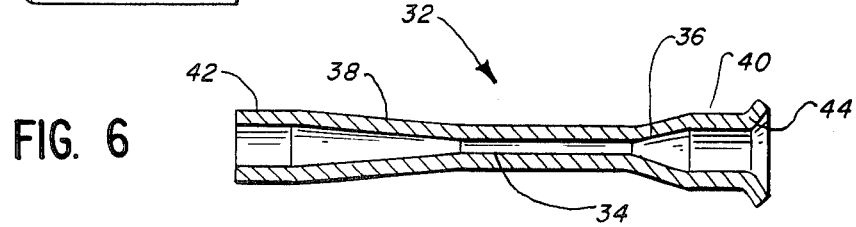
FIG. 6 is an enlarged cross-sectional view of the tubular nozzle structure shown in FIG. 2.
Figure 7:
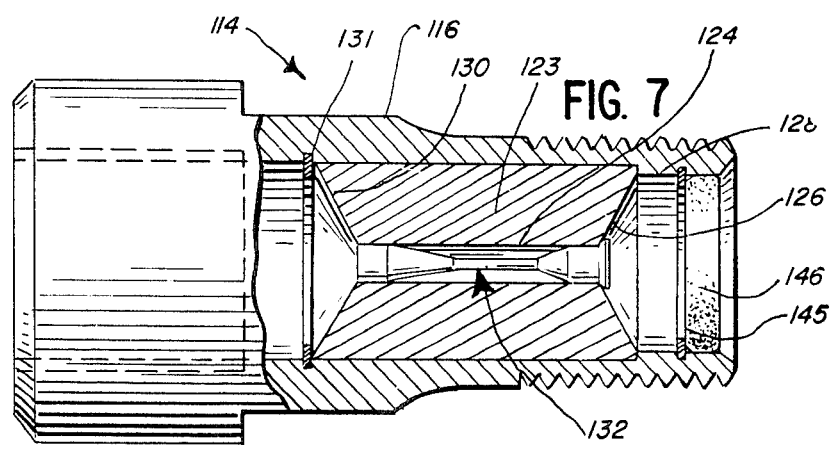
FIG. 7 is a side elevation view of a modified constriction device according to this invention, with partial cross-section showing a replaceable bore housing.
Figure 8A:
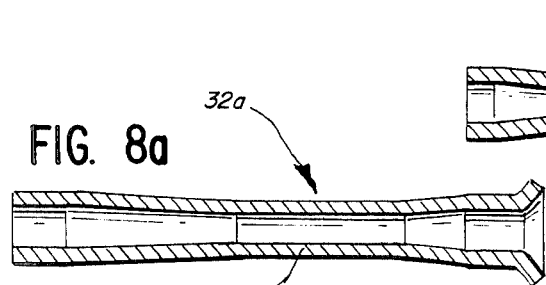
FIGS. 8a–8d are cross-sectional side views of tubular nozzle structures according to this invention, showing modifications of dimensions of portions of the flow constriction.
Figure 8C:
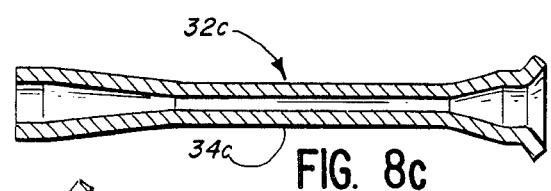
Figure 8B:
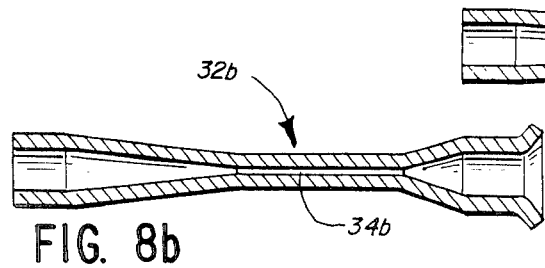
Figure 8D:
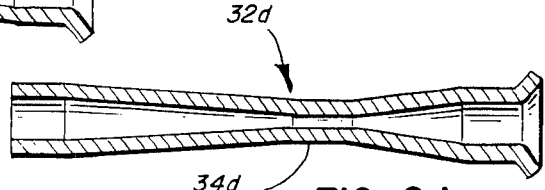

Referring to FIG. 7, modified nozzle device 114 is shown with body 116 provided with a removable bore housing 123 for bore 124. Body 116 is circumferentially grooved to receive a retaining ring 131 for engageably positioning conically formed exit formation 130 on bore housing 123, leading from bore 124. Similarly, a removable annular passage 128 engages a conical entrance formation 126 on bore housing 123. Body 116 is circumferentially grooved to receive retainer ring 145 which is engaged between annular passage 128 and a filter element 146. A tubular nozzle structure 132, having configuration similar to nozzle structure 32 shown in FIGS. 2 and 6, is removably inserted within bore 124. Removable bore housing 123 allows even greater flexibility in design because a range in the diameter of bore 124 can be conveniently employed with a single body 116.

In a modified embodiment shown in FIG. 9, constriction device 214 includes body 216 in which bore 224 has conical entrance 226 and exit 230 formations. In this embodiment, tubular nozzle structure 232 rearwardly projects from bore 224; as shown in FIG. 9, nozzle structure 232 can extend entirely through the conical exit formation 230 from bore 224 to a point within the cylindrical exit passage 231 from body 216. The rearward projection of the inserted nozzle device 232 from bore 224 permits greater extension of the length of the constricted passageway 234 shown in FIG. 11, completely independent on the length of the bore 224, as shown in FIG. 9. Thus, the extended length of constricted passageway 234 permits increased restriction in the flow of condensate with a reduction in the passage of escaping steam, commonly expressed as the ratio of the rate of discharge for liquid mass to the rate of discharge for vapor mass. While the length of small diameter orifices which are drilled in the prior art devices is restricted, typically to a maximum of approximately 0.250 inch, the insertable tubular nozzle structure of this invention enables easier fabrication of the flow constriction as well as convenient variation in both the diameter and length of the flow constriction employed, with the added practical advantage of a single bore diameter.

Referring now to FIG. 9, nozzle structure 232 includes an outwardly flanged entrance formation 236 on the tubular body 238; flange formation 236 engages the conically formed bore entrance 226 for positioning the insertion of nozzle structure 232 within bore 224. Preferably, at least a portion of tubular body 238 adjoining flange entrance 236 has an outer diameter approximately equal to the diameter of bore 224 to provide a frictional press fit upon the insertion of nozzle structure 232 within bore 224. As best shown in FIG. 11, constricted passageway 234 provided in nozzle structure 232 is tapered in the configuration of a modified venturi tube. Constricted passageway, generally designated by reference character 234, includes an inwardly converging conical inlet 235 adjacent to flange formation 236. Inlet 235 converges to a short cylindrical formation 237 which leads to a second converging conical formation 237$a$ which converges to a first generally elongate cylindrical constriction 239. A second generally cylindrical constriction 241 is coaxially aligned endwise with constriction 239 and constriction 241 has a somewhat larger diameter as illustrated in FIG. 11. A truncate conical bore 243 joins constriction 239 with constriction 241. A third cylindrical constriction 245 is coaxially aligned endwise and has a somewhat larger diameter than constriction 241. A second truncate conical bore 247 joins constriction 245 with constriction 241. The axial alignment of constrictions 239, 241 and 245 forms a sequence in the order of increasing relative diameter of the cylindrical constrictions, and bores 243 and 247 provide gradual transition between the respective constrictions. A substantially cylindrical constricted passageway can also be employed in the tubular nozzle structure of this invention. Most preferably, the terminus 240 of constriction 234 is positioned in rearward projection from bore 224 as described with reference to FIG. 9.

Referring again to FIG. 9, a cylindrical passage 242 leading to conical bore entrance 226 can be provided with an annular shoulder 244 having an annular corner 244$a$. A generally circular filter member 246 can be positioned adjacent the shoulder 244; the central portion 246$a$ of filter element 246 can be inwardly bent toward bore 224 and secured by a similarly bent annular retainer ring 248, which pinches filter member 246 against corner 244a as best shown in FIG. 10. Filter member 246 is positioned upstream from nozzle structure 232 in order to remove debris from condensate prior to its passage through nozzle structure 232 within constriction 234. The retainer ring 248 is of suitable diameter to frictionally engage against the inner circumference 250 for sealing function.

The embodiments described and shown in the drawings are illustrative of this invention but do not indicate limitation upon the scope of the appended claims.

I claim:

1. In a device for drainage of condensate from steam systems without passage of live steam, the improvement comprising:
    A. a body structure having a fluid flow conduit therethrough and including a generally cylindrical bore formed entirely within said body structure;
    B. a first tubular nozzle frictionally mounted within said bore, said first nozzle having an internal constricted passageway therethrough communicating with said conduit, said first nozzle being interchangeable with at least a second tubular nozzle having external configuration likewise for frictional mounting within said bore, said second nozzle having an internal constricted passageway which is selected to be different in configuration than that of said first nozzle in order to enable variation in the constricted passageway suitable for operation with different steam pressures and different condensate drainage in said steam systems;
    C. said conduit including a conical formation within said body structure, said conical formation opening outwardly from an entrance to said bore;
    D. said first tubular nozzle including a terminal flange engaging said conical formation; and
    E. said first nozzle including at least first and second generally coaxial and cylindrical constrictions formed within said passageway, the second of said constrictions having a somewhat larger diameter than the diameter of the first of said constrictions, said nozzle further including a first generally truncated conical bore joining said first and second constrictions, wherein the diameter of each end of said truncated bore is the same as the diameter of the respective constriction to which said respective end is joined in order to prevent sudden expansion of the condensate flowing from said first constriction and first conical bore into said second constriction.

2. The device as claimed in claim 1, wherein said body structure includes an exit formation at the opposite end from said entrance to said bore and wherein said tubular nozzle projects from said bore into said exit formation.

* * * * *